(12) United States Patent
Rawal et al.

(10) Patent No.: US 10,312,028 B2
(45) Date of Patent: Jun. 4, 2019

(54) ELECTROCHEMICAL ENERGY STORAGE DEVICES AND MANUFACTURING METHODS

(71) Applicant: AVX Corporation, Fountain Inn, SC (US)

(72) Inventors: Bharat Rawal, Surfside Beach, SC (US); Carl L. Eggerding, Greenville, SC (US); Bob Knopsnyder, Simpsonville, SC (US)

(73) Assignee: AVX Corporation, Fountain Inn, SC (US)

( * ) Notice: Subject to any disclaimer, the term of this patent is extended or adjusted under 35 U.S.C. 154(b) by 320 days.

(21) Appl. No.: 14/749,785

(22) Filed: Jun. 25, 2015

(65) Prior Publication Data

US 2015/0380175 A1    Dec. 31, 2015

Related U.S. Application Data

(60) Provisional application No. 62/018,739, filed on Jun. 30, 2014.

(51) Int. Cl.

| *H01G 11/60* | (2013.01) |
|---|---|
| *H01G 11/72* | (2013.01) |
| *H01G 11/80* | (2013.01) |
| *H01G 11/74* | (2013.01) |
| *H01G 11/12* | (2013.01) |
| *H01G 11/76* | (2013.01) |

(Continued)

(52) U.S. Cl.
CPC ............ *H01G 11/60* (2013.01); *H01G 11/12* (2013.01); *H01G 11/72* (2013.01); *H01G 11/74* (2013.01); *H01G 11/76* (2013.01); *H01G 11/80* (2013.01); *H01G 11/82* (2013.01); *H01G 11/84* (2013.01); *Y02E 60/13* (2013.01)

(58) Field of Classification Search
CPC ........ H01G 11/28; H01G 11/04; H01G 11/42; H01G 11/32; H01G 11/66; H01G 9/025; H01G 9/10; H01G 9/15
See application file for complete search history.

(56) References Cited

U.S. PATENT DOCUMENTS

| 3,652,902 A | 3/1972 | Hart et al. |
| 4,267,565 A | 5/1981 | Puppolo et al. |

(Continued)

FOREIGN PATENT DOCUMENTS

| CN | 203406180 U | 1/2014 |
| CN | 203596278 U | 5/2014 |

(Continued)

OTHER PUBLICATIONS

Product Information on TIMREX® Graphite and ENSACO™ Carbon Black from TIMCAL Ltd., 2004, 24 pages.

*Primary Examiner* — Nguyen T Ha

(74) *Attorney, Agent, or Firm* — Dority & Manning, P.A.

(57) ABSTRACT

An ultra-thin electrochemical energy storage device is provided which utilizes electrode material with multi-layer current collectors and with an organic electrolyte between the electrodes. Multiple cells may be positioned in a plurality of stacks and all of the cells may be in series, parallel or some combination thereof. The energy storage device can be constructed at less than 0.5 millimeters thick and exhibit very low ESR and higher temperature range capabilities.

36 Claims, 14 Drawing Sheets

(51) Int. Cl.
*H01G 11/82* (2013.01)
*H01G 11/84* (2013.01)

(56) References Cited

U.S. PATENT DOCUMENTS

| | | | |
|---|---|---|---|
| 4,267,566 A | 5/1981 | Moresi, Jr. | |
| 4,766,523 A | 8/1988 | Mori | |
| 5,079,674 A | 1/1992 | Malaspina | |
| 5,150,283 A | 9/1992 | Yoshida et al. | |
| 5,279,623 A | 1/1994 | Watanabe et al. | |
| 5,381,303 A | 1/1995 | Yoshida et al. | |
| 5,426,561 A | 6/1995 | Yen et al. | |
| 5,445,856 A | 8/1995 | Charloner-Gill | |
| 5,591,540 A | 1/1997 | Louie et al. | |
| 5,621,607 A * | 4/1997 | Farahmandi | H01G 9/038 |
| | | | 361/502 |
| 5,777,428 A | 7/1998 | Farahmandi et al. | |
| 5,973,913 A | 10/1999 | McEwen et al. | |
| 6,059,847 A | 5/2000 | Farahmandi et al. | |
| 6,064,561 A | 5/2000 | Harada et al. | |
| 6,064,562 A | 5/2000 | Okamura | |
| 6,187,061 B1 | 2/2001 | Amatucci et al. | |
| 6,198,620 B1 | 3/2001 | Wei et al. | |
| 6,212,061 B1 | 4/2001 | Irwin et al. | |
| 6,304,426 B1 | 10/2001 | Wei et al. | |
| 6,335,858 B1 | 1/2002 | Vasechkin et al. | |
| 6,349,027 B1 | 2/2002 | Suhara et al. | |
| 6,352,565 B2 | 3/2002 | Suhara et al. | |
| 6,364,915 B1 | 4/2002 | Chapman-Irwin et al. | |
| 6,379,402 B1 | 4/2002 | Suhara et al. | |
| 6,414,837 B1 | 7/2002 | Sato et al. | |
| 6,424,517 B1 | 7/2002 | Ikeda et al. | |
| 6,430,031 B1 | 8/2002 | Dispennette et al. | |
| 6,447,555 B1 | 9/2002 | Okamura et al. | |
| 6,449,139 B1 | 9/2002 | Farahmandi et al. | |
| 6,466,429 B1 | 10/2002 | Volkovich et al. | |
| 6,493,210 B2 | 12/2002 | Nonaka et al. | |
| 6,552,895 B1 | 4/2003 | Vassallo et al. | |
| 6,576,365 B1 * | 6/2003 | Meitav | H01M 10/0436 |
| | | | 29/623.1 |
| 6,627,343 B1 | 9/2003 | Kim et al. | |
| 6,628,504 B2 | 9/2003 | Volkovich et al. | |
| 6,631,072 B1 | 10/2003 | Paul et al. | |
| 6,726,732 B2 | 4/2004 | Kim et al. | |
| 6,728,095 B2 | 4/2004 | Suhara et al. | |
| 6,743,544 B2 | 6/2004 | Kim et al. | |
| 6,751,084 B2 | 6/2004 | Nakazawa et al. | |
| 6,830,594 B2 | 12/2004 | Shinozaki et al. | |
| 6,842,330 B2 | 1/2005 | Farahmandi et al. | |
| 6,847,517 B2 | 1/2005 | Iwaida et al. | |
| 6,898,067 B1 | 5/2005 | Hiratsuka et al. | |
| 6,944,010 B1 | 9/2005 | Paul et al. | |
| 7,019,960 B2 | 3/2006 | Okamura et al. | |
| 7,057,879 B2 | 6/2006 | Iwaida et al. | |
| 7,061,750 B2 | 6/2006 | Oyama et al. | |
| 7,090,706 B2 | 8/2006 | Farahmandi et al. | |
| 7,095,603 B2 | 8/2006 | Mahon et al. | |
| 7,116,545 B2 | 10/2006 | Farahmandi et al. | |
| 7,154,738 B2 | 12/2006 | Oyama et al. | |
| 7,227,737 B2 | 6/2007 | Mitchell et al. | |
| 7,233,482 B2 | 6/2007 | James et al. | |
| 7,256,981 B2 | 8/2007 | Kosuda et al. | |
| 7,273,597 B2 | 9/2007 | Takeuchi et al. | |
| 7,310,219 B2 | 12/2007 | Kosuda et al. | |
| 7,382,600 B2 | 6/2008 | Paul et al. | |
| 7,407,520 B2 | 8/2008 | Farahmandi et al. | |
| 7,486,497 B2 | 2/2009 | Kobayashi et al. | |
| 7,554,790 B2 | 6/2009 | James et al. | |
| 7,570,478 B2 | 8/2009 | Terada et al. | |
| 7,623,339 B2 | 11/2009 | Takahashi et al. | |
| 7,811,337 B2 | 10/2010 | Zhong et al. | |
| 7,830,646 B2 | 11/2010 | Eilertsen | |
| 7,864,508 B2 | 1/2011 | Fukumine | |
| 7,920,371 B2 | 4/2011 | Mitchell et al. | |
| 7,939,600 B2 | 5/2011 | Mori et al. | |
| 7,948,738 B2 | 5/2011 | Shimamoto et al. | |
| 8,077,444 B2 | 12/2011 | Osawa | |
| 8,098,481 B2 | 1/2012 | Zong et al. | |
| 8,098,482 B2 | 1/2012 | Clelland et al. | |
| 8,098,483 B2 | 1/2012 | Eilertsen | |
| 8,223,473 B2 | 7/2012 | Dreissig et al. | |
| 8,351,182 B2 | 1/2013 | Yamada et al. | |
| 8,472,164 B2 | 6/2013 | Kim | |
| 8,497,225 B2 | 7/2013 | Zhamu et al. | |
| 8,537,525 B2 | 9/2013 | Yamazaki et al. | |
| 8,591,757 B2 | 11/2013 | Ohishi et al. | |
| 8,652,687 B2 | 2/2014 | Zhamu et al. | |
| 8,749,953 B2 | 6/2014 | Momo et al. | |
| 8,760,851 B2 | 6/2014 | Signorelli et al. | |
| 8,848,338 B2 | 9/2014 | Norieda et al. | |
| 8,932,750 B2 | 1/2015 | Cooley et al. | |
| 8,947,856 B2 | 2/2015 | Wang et al. | |
| 8,964,357 B2 | 2/2015 | Tamachi et al. | |
| 8,982,535 B2 | 3/2015 | Soulliere et al. | |
| 9,209,434 B2 | 12/2015 | Epstein | |
| 9,478,366 B2 | 10/2016 | Yokouchi et al. | |
| 9,576,746 B2 | 2/2017 | Ueno et al. | |
| 9,679,703 B2 | 6/2017 | Bendale et al. | |
| 9,818,552 B2 | 11/2017 | Lane et al. | |
| 2002/0138958 A1 | 10/2002 | Nonaka et al. | |
| 2002/0164441 A1 | 11/2002 | Amine et al. | |
| 2003/0007316 A1 * | 1/2003 | Takasugi | H01G 9/155 |
| | | | 361/502 |
| 2005/0211136 A1 * | 9/2005 | Drummond | H01G 9/038 |
| | | | 106/311 |
| 2005/0231891 A1 * | 10/2005 | Harvey | H01G 11/32 |
| | | | 361/502 |
| 2006/0087799 A1 * | 4/2006 | Kosuda | H01G 11/42 |
| | | | 361/516 |
| 2006/0092596 A1 | 5/2006 | Otsuki et al. | |
| 2008/0003166 A1 | 1/2008 | Maletin et al. | |
| 2008/0013253 A1 | 1/2008 | Thrap et al. | |
| 2008/0016664 A1 | 1/2008 | Mitchell et al. | |
| 2008/0259525 A1 | 10/2008 | Guillet et al. | |
| 2009/0244812 A1 * | 10/2009 | Rawal | H01G 2/06 |
| | | | 361/525 |
| 2009/0279230 A1 | 11/2009 | Eilertsen et al. | |
| 2010/0266878 A1 | 10/2010 | Eilertsen | |
| 2012/0044614 A1 | 2/2012 | Hommo et al. | |
| 2012/0183886 A1 | 7/2012 | Zhong et al. | |
| 2013/0026978 A1 | 1/2013 | Cooley et al. | |
| 2013/0059195 A1 * | 3/2013 | Kuriki | H01M 4/134 |
| | | | 429/163 |
| 2013/0120906 A1 | 5/2013 | Soulliere et al. | |
| 2013/0280569 A1 | 10/2013 | Mori et al. | |
| 2013/0323585 A1 | 12/2013 | Inoue et al. | |
| 2014/0029165 A1 | 1/2014 | Takahashi et al. | |
| 2014/0035540 A1 * | 2/2014 | Ehrenberg | H01G 11/32 |
| | | | 320/167 |
| 2014/0042988 A1 | 2/2014 | Kuttipillai | |
| 2014/0065447 A1 * | 3/2014 | Liu | H01M 4/131 |
| | | | 429/7 |
| 2014/0098465 A1 | 4/2014 | Bendale et al. | |
| 2014/0139972 A1 | 5/2014 | Yokoshima | |
| 2014/0377668 A1 | 12/2014 | Abe et al. | |
| 2015/0207114 A1 | 7/2015 | Khakhalev et al. | |
| 2016/0254104 A1 | 9/2016 | Eilertsen | |
| 2017/0338054 A1 | 11/2017 | Knopsnyder et al. | |
| 2017/0338055 A1 | 11/2017 | Knopsnyder et al. | |
| 2017/0338059 A1 | 11/2017 | Knopsnyder et al. | |
| 2017/0338061 A1 | 11/2017 | Knopsnyder et al. | |
| 2017/0338669 A1 | 11/2017 | Hansen | |
| 2018/0144878 A1 | 5/2018 | Ritter et al. | |

FOREIGN PATENT DOCUMENTS

| | | |
|---|---|---|
| EP | 0 938 109 A2 | 8/1999 |
| EP | 1256966 A1 | 11/2002 |
| GB | 2 044 000 B | 8/1983 |
| JP | H 06342739 | 12/1994 |
| JP | H 09270370 A | 10/1997 |
| JP | H 09298129 A | 11/1997 |
| JP | 2004253562 | 9/2004 |

(56) References Cited

FOREIGN PATENT DOCUMENTS

| | | |
|---|---|---|
| JP | 2012069408 | 4/2012 |
| KR | 100383511 B1 | 5/2003 |
| KR | 100516108 B1 | 9/2005 |
| WO | WO0137295 | 5/2001 |

* cited by examiner

ELECTROCHEMICAL ENERGY STORAGE DEVICES AND MANUFACTURING METHODS

PRIORITY CLAIM

This application claims the benefit of previously filed U.S. Provisional Patent Application entitled "ORGANIC ELECTROLYTE CAPACITORS," assigned U.S. Ser. No. 62/018,739, filed Jun. 30, 2014, and which is incorporated herein by reference for all purposes.

FIELD OF THE SUBJECT MATTER

The presently disclosed technology generally relates to electrochemical systems for storage and release of electrical energy and corresponding methodologies. More particularly, the presently disclosed technology relates to construction of organic-based electrolyte capacitor devices having very low equivalent series resistance (ESR) (and corresponding low resistivity) and elevated temperature operational capabilities, together with an ultra-thin construction, for providing specialized supercapacitor energy storage device performance.

BACKGROUND OF THE SUBJECT MATTER

The presently disclosed subject matter generally relates to electrochemical energy storage devices and manufacturing methods. In particular, the presently disclosed subject matter relates to electrochemical systems for use in electronic circuits, for example, as capacitors and/or batteries. More particularly, the presently disclosed subject matter relates to electrochemical systems having an organic solution electrolyte material.

Further still, in part, the presently disclosed subject matter relates to improved designs for assembly of a plurality of single cells of an electrochemical system. More particularly, individual cells may be connected individually to each other to form a stack (within a single case or plural cases), with stacks connected together to form an assembly. Further, the presently disclosed subject matter is more versatile for achieving inter-cell or inter-stack connections in series, parallel, or combinations thereof and for achieving hybrid packs of a battery or batteries combined with a capacitor or capacitors in a single integrated product.

As various electronic devices become more portable and provide more functionality, corresponding advances have been needed in the features and components of such devices that enable such portability. Frequently the limiting factor in both size and functionality of an electronic apparatus is the size and weight of its component parts and in particular, the size and weight of associated energy storage components. The general push towards miniaturization of electronics has also resulted in the integration of various components into a single device to save both room and weight.

Typical main energy sources used for portable electronics involve electrochemical batteries and/or electrochemical capacitors. As with other devices and components, one limiting aspect of energy storage components is the packaging of the electrochemical system, and the resulting size of the system.

From a performance perspective, additional aspects which impact or limit the use of particular constructions in particular applications are the range of temperatures within which the components are functional, as well as the equivalent series resistance (ESR) of the component relative to associated circuitry.

It is, therefore, desirable to provide an ultra-thin (ultra-low profile) energy storage component that may comprise an electrochemical capacitor using an organic electrolyte.

It is also desirable to provide such an electrochemical energy storage component useful for a single electronic device but wherein the cells are in series or parallel or a combination thereof by virtue of the component's construction.

Furthermore, it is desirable to provide such a device having improved very low ESR (and corresponding very low resistivity) and having an expanded temperature range for useful operation.

While various implementations of capacitor devices and associated assemblies and construction methodologies therefor have been developed, no design has emerged that generally encompasses all of the desired characteristics as hereafter presented in accordance with the subject technology.

SUMMARY OF THE SUBJECT MATTER

The presently disclosed subject matter recognizes and addresses various of the foregoing limitations and drawbacks, and others, concerning both the designs of electrochemical energy storage components and methods of making the same. Thus, broadly speaking, an object of certain embodiments of the presently disclosed technology is to provide improved designs for certain capacitor components and component assemblies associated with organic electrolyte-based capacitors. Other objects, broadly speaking relate to providing an improved ultra-thin electrochemical energy storage component comprising, that are connected in series, parallel or some combination thereof, in addition to improved methods of making such components.

It is, therefore, a principle object of the presently disclosed subject matter to provide an improved electrochemical capacitor Another more particular object of the presently disclosed subject matter is to provide an electrochemical capacitor device with a very low (or ultra-low) equivalent series resistance (ESR) (and corresponding very low resistivity).

It is still a further object of the presently disclosed subject matter to provide an ultra-thin electrochemical capacitor device. In such context, it is a more particular object of the presently disclosed subject matter to provide an electrochemical energy storage component which by virtue of its construction facilitates placement of multiple connected cells in series, parallel or a combination thereof for varying capacitance and/or voltage It is a further object of the presently disclosed subject matter to provide an ultra-thin electrochemical energy storage component that can be effectively manufactured.

It is a further object of the presently disclosed subject matter to provide an electrochemical energy storage component that effectively has an expanded temperature range of operation.

It is a further object of the presently disclosed subject matter to provide an improved electrochemical energy storage component that can be effectively manufactured with greatly reduced exposure to moisture during the manufacturing process, to yield a product with improved dimensional stability responsive to heat exposure.

It is a further object of the presently disclosed subject matter to provide an electrochemical energy storage component that effectively comprises a low ESR pulse super capacitor, or an improved low ESR electrochemical double layer capacitor (EDLC).

One exemplary embodiment in accordance with presently disclosed subject matter relates to an ultra-thin electrochemical energy storage device. Such a device preferably comprises a pair of respective internal electrodes with electrolyte; a separator layer between such respective electrodes; a pair of respective current collectors, with one each of such current collectors respectively outside each of such electrodes; and a case surrounding such current collectors, and having a respective pair of terminals connected respectively with such current collectors. Preferably, also the contents of such case have a thickness down to less than 0.5 millimeters.

In some variations of the foregoing, such case may have a moisture content of no more than about 10 ppm. In some such alternatives, such electrolyte may comprise an organic electrolyte, and in others such electrolyte comprises at least in part propylene carbonate.

In other alternative embodiments, such case may have a moisture content of no more than about 10 ppm, and such device may have a resistivity of no more than about 1.5 $\Omega \cdot cm^2$ of electrode area and a temperature operational range rating of −40° to 70° C.

In yet other configurations of exemplary embodiments, a plurality of such devices may be arranged as multiple cells positioned in a plurality of stacks configured in one of series or parallel connections, or combinations thereof.

In still other alternative configurations of exemplary embodiments, such device may include a plurality of such pair of internal electrodes, separator layer, and such pair of current collectors surrounded by such case, and such case may have a thickness of from 0.5 millimeters to 5.0 millimeters.

For other presently disclosed exemplary ultra-thin electrochemical energy storage device embodiments, such electrolyte may comprise an organic electrolyte; and such device may comprise an electrochemical double layer (ECDL) capacitor having a capacitance density of at least about 10 Farads per cc of active electrode volume. In still another alternative embodiment of such a presently disclosed ultra-thin electrochemical energy storage device, such electrolyte may have a boiling point over 200° C.; such case may further include thermally stable sealant materials; and such capacitor may have a temperature operational half-voltage range rating of up to 90° C. Alternatively, such organic electrolyte may include at least some of propylene carbonate; and such case may have dimensions of about 50 mm long×40 mm wide×0.5 mm thick, and may maintain dimensional stability at up to about 105° C. storage temperature, while also maintaining very low ESR of down to about 150 mΩ.

In yet another presently disclosed exemplary embodiment, an ultra-thin, ultra-low ESR supercapacitor preferably comprises a pair of respective internal electrodes with organic electrolyte; an ultra-thin separator layer between such respective electrodes; a pair of respective multi-layer current collectors, with one each of such current collectors respectively outside each of such electrodes; and a case surrounding such current collectors, and having a respective pair of terminals connected respectively with such current collectors. Further, the contents of such case preferably have a thickness down to less than 0.5 millimeters, and a moisture content of no more than about 10 ppm, and such supercapacitor has a resistivity of no more than about 1.5 $\Omega \cdot cm^2$ of electrode area, capacitance density of at least about 10 Farads per cc of active electrode volume, and a temperature operational range rating of −40° to 70° C.

In a presently disclosed exemplary variation of such a supercapacitor, such supercapacitor may comprise a carbon double layer capacitor with a voltage rating of 4.2 volts, and a temperature operational half-voltage range rating of −40° to 90° C. In another variation, such organic electrolyte may include at least some of propylene carbonate.

For other alternatives, a plurality of such supercapacitors may be arranged as multiple cells positioned in a plurality of stacks. In some such instances, such stacks of multiple cells may be arranged in one of series or parallel connections, or combinations thereof.

In other variations of such exemplary supercapacitors, such device may include a plurality of such pair of internal electrodes, separator layer, and such pair of current collectors surrounded by such case, and such case may have a thickness of from 0.5 millimeters to 5.0 millimeters.

For yet other variations of presently disclosed supercapacitor exemplary embodiments, such electrolyte may have a boiling point over 200° C.; such case may further include thermally stable sealant materials; and such supercapacitor may have a temperature operational half-voltage range rating of up to 90° C. In others, such case may have dimensions of about 50 mm long×40 mm wide×0.5 mm thick, and may maintain dimensional stability at up to about 105° C. storage temperature, while also maintaining very low ESR of down to about 150 mΩ.

It should be appreciated from the complete disclosure herewith that the presently disclosed subject matter equally relates to apparatus as well as corresponding and/or associated methodology. One exemplary embodiment of presently disclosed methodology relates to methodology for manufacturing an ultra-thin electrochemical energy storage device, such methodology preferably comprising providing a pair of respective internal electrodes with electrolyte, and with a separator layer between such respective electrodes; providing a pair of respective current collectors, with one each of such current collectors respectively outside each of such electrodes; and surrounding such current collectors with a case having a respective pair of terminals connected respectively with such current collectors. Further, preferably per such exemplary embodiment, the contents of such case have a thickness down to less than 0.5 millimeters. In some variations of such methodology, such methodology may be performed in a controlled environment having a moisture content of no more than about 10 ppm.

In other presently disclosed variations, a plurality of such devices may be arranged as multiple cells positioned in a plurality of stacks configured in one of series or parallel connections, or combinations thereof, for selectively achieving desired capacitance and/or operational voltage levels. In yet other variations, such device may include a plurality of such pair of internal electrodes, separator layer, and such pair of current collectors surrounded by such case, and such case may have a thickness of from 0.5 millimeters to 5.0 millimeters.

In other exemplary alternatives, such electrolyte may include at least some of propylene carbonate; and such case may have dimensions of about 50 mm long×40 mm wide× 0.5 mm thick, and may maintain dimensional stability at up to about 105° C. storage temperature, while also maintaining very low ESR of down to about 150 mΩ.

Another presently disclosed exemplary embodiment relates to methodology for making an ultra-thin, ultra-low ESR supercapacitor, such methodology preferably comprising providing a pair of respective internal electrodes with organic electrolyte, and with an ultra-thin separator layer between such respective electrodes; providing a pair of respective multi-layer current collectors, with one each of such current collectors respectively outside each of such electrodes; and surrounding such current collectors with a case having a respective pair of terminals connected respectively with such current collectors. Further, per such exemplary embodiment, preferably the contents of such case may have a thickness down to less than 0.5 millimeters, and such methodology is performed in a controlled environment having a moisture content of no more than about 10 ppm, and such supercapacitor has a resistivity of no more than about 1.5 $\Omega \cdot cm^2$ of electrode area, capacitance density of at least about 10 Farads per cc of active electrode volume, and a temperature operational range rating of −40° to 70° C.

In some variations of the foregoing, such methodology may comprise arranging a plurality of such supercapacitors as multiple cells positioned in a plurality of stacks, for selectively achieving desired capacitance and/or operational voltage levels. For other such variations, such stacks of multiple cells may be arranged in one of series or parallel connections, or combinations thereof, for achieving hybrid packs of a battery or batteries combined with a capacitor or capacitors in a single integrated product. In still other variations, such device may include a plurality of such pair of internal electrodes, separator layer, and such pair of current collectors surrounded by such case, and such case may have a thickness of from 0.5 millimeters to 5.0 millimeters.

For other presently disclosed alternatives, such electrolyte may have a boiling point over 200° C.; such case may further include thermally stable sealant materials; and such supercapacitor may have a temperature operational half-voltage range rating of up to 90° C.

Additional objects and advantages of the presently disclosed subject matter are set forth herein, or will be apparent to those of ordinary skill in the art from, the detailed description as follows. Also, it should be further appreciated that modifications and variations to the specifically illustrated and discussed features and materials hereof may be practiced in various embodiments and uses of the presently disclosed subject matter without departing from the spirit and scope thereof, by virtue of present reference thereto. Such variations may include, but are not limited to, substitutions of the equivalent steps, means, features, and materials for those shown or discussed, and the functional or positional reversal of various steps, parts, features, or the like.

Still further, it is to be understood that different embodiments, as well as different presently preferred embodiments, of the presently disclosed subject matter, may include various combinations or configurations of presently disclosed steps, features, elements, or their equivalents (including combinations of steps, features or configurations thereof not expressly shown in the figures or stated in the detailed description).

These and other features, aspects and advantages of the presently disclosed subject matter will become better understood with reference to the following description. The accompanying drawings, which are incorporated in and constitute a part of this specification, illustrate an embodiment of the presently disclosed subject matter and, together with the description, serve to explain principles of the presently disclosed subject matter.

BRIEF DESCRIPTION OF THE DRAWINGS

A full and enabling description of the presently disclosed subject matter, including the best mode thereof, directed to one of ordinary skill in the art, is set forth in the specification, which makes reference to the appended figures, in which.

Repeat use of references and descriptions throughout the present specification and appended drawings is intended to represent same or analogous features, elements, or steps of the presently disclosed subject matter.

DETAILED DESCRIPTION THE PREFERRED EMBODIMENTS

As discussed in the Summary of the Subject Matter section, the presently disclosed subject matter is generally concerned with certain organic electrolyte capacitor devices and related technology and manufacturing and/or mounting methodology. More particularly, the presently disclosed subject matter is concerned with improved designs for certain ultra-thin and ultra-low ESR supercapacitor components and energy storage component assemblies and related methodologies.

Selected combinations of aspects of the disclosed technology correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of another embodiment to yield yet further embodiments. In additional, certain features may be interchanged with similar devices or features not expressly mentioned which perform the same or similar function.

Figure 1:
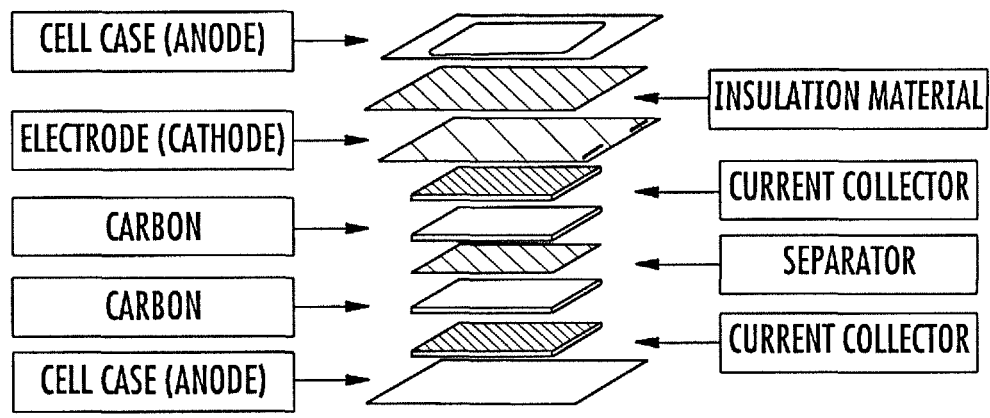
FIG. 1 illustrates an exploded isometric view of layers comprising an exemplary prior art electrochemical energy storage device.
Figure 2:
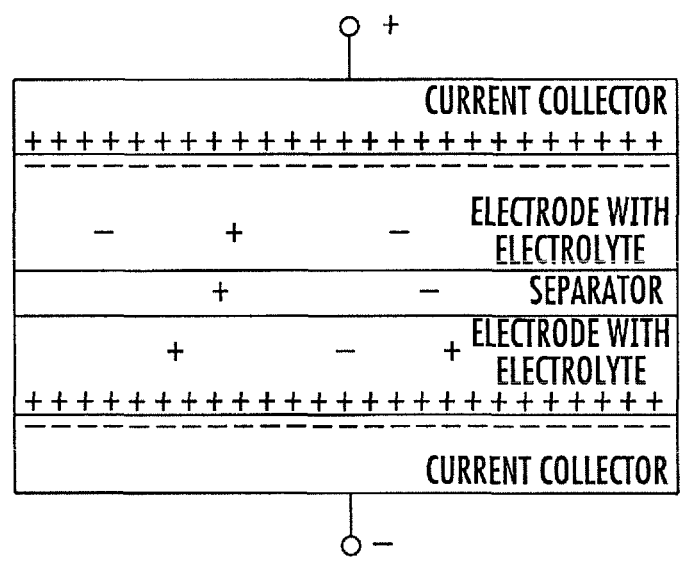
FIG. 2 is a schematic of an exemplary embodiment of an electrochemical double layer capacitor (ECDL) device in accordance with presently disclosed subject matter.

Reference will now be made in detail to exemplary presently preferred embodiments, and for which FIG. 2 illustrates a schematic view of an exemplary electrochemical double layer capacitor (ECDL) device constructed in accordance with the presently disclosed technology. To better understand the presently disclosed subject matter, some additional background is provided for ECDL devices, as follows. FIG. 1 illustrates an exploded isometric view of layers comprising an exemplary prior art electrochemical energy storage device. See, for example, also FIG. 4 of commonly owned U.S. Pat. No. 6,576,365 (to Meitav, et al.), relating to electrochemical energy storage devices, and the complete disclosure of which is fully incorporated herein for all purposes. Generally speaking, such double layer capacitors have certain benefits compared with electronic technologies.

Considering how an electrochemical (ECDL) capacitor works, its most significant difference from an electronic capacitor is that the charge transfer is carried out by electrons in the electronic capacitor and by electrons and ions in the ECDL device. The anions and cations involved in double layer supercapacitors are contained in the electrolyte which may be liquid (sometimes an aqueous or organic solution) or solid. The solid electrolyte is frequently a conductive polymer.

Electrons are relatively fast moving and therefore transfer charge "instantly". However, ions have to move relatively slowly from anode to cathode. Thus, a finite amount of time is needed to establish the full nominal capacitance of the device. Such nominal capacitance is normally measured at 1 second. Various differences between EDLC (Electrochemical Double Layer Capacitors) and electronic capacitors may be summarized, as follows:

- A capacitor basically consists of two conductive plates (electrodes), separated by a layer of dielectric material, which may be such as ceramic, plastic film, paper, aluminum oxide, or similar.
- EDLCs do not use a discrete dielectric interphase separating the electrodes. EDLCs utilize the charge separation, which is formed across the electrode-electrolyte interface.
- The EDLC constitutes of two types of charge carriers: IONIC species on the ELECTROLYTE side and ELECTRONIC species on the ELECTRODE side.

The exploded isometric view of present FIG. 1 illustrates layers comprising a representative prior art electrochemical energy storage device.

In this instance, a case or frame provides form for common internal cell structure, with the outer layers (top and bottom) of the structure comprised of cell case materials comprising anode elements. A pair of current collectors may be provided as illustrated in representative prior art FIG. 1. They may comprise, for example, a first layer of conductive polymer that is in contact with the cell electrode. A second conductive structure (layer) may be preferably a metal, metal alloy, metallic film or a combination or mixture thereof displaying high conductivity, low contact resistance, and good adhesive properties to the conductive polymer layer or polymer composite.

One current collector may be adhered to the lower cell case while the other current collector is adjacent an electrode comprising the cathode of the arrangement. Thus, a layer of insulation material is represented between such cathode electrode and the cell case anode. Each current collector as illustrated is otherwise adjacent a layer of carbon, each of which may be in turn be adjacent a separator layer.

FIG. 2 illustrates a schematic view of an exemplary electrochemical double layer capacitor (ECDL) device constructed in accordance with the presently disclosed technology, and therefore comprising a very low ESR ECDL device or pulse supercapacitor (suitable for providing a pulse-capable energy storage device). As shown, a separator layer is sandwiched between a pair of electrodes with electrolyte, which are in turn exteriorly sandwiched by a pair of current collectors. Such electrolyte preferably comprises an organic electrolyte. For a number of presently disclosed embodiments, propylene carbonate (PC) electrolytes are preferred.

With such an arrangement, it's been shown possible to provide a carbon carbon (CC) capacitor with collective electrical characteristics of Low ESR from 50 to 300 mΩ (that is, a resistivity of no more than about 1.5 Ω·cm² of electrode area, and in some instances 1.3 Ω·cm² or less of electrode area), Capacitance of 1 to 10 F (that is, capacitance density of at least about 10 Farads per cc of active electrode volume), Leakage Current <50 µA, and Voltage ratings of 2.1 to 4.2 V.

For one example application, Constant Power of 1 W is provided with 4 second back up), as follows:
Assume total $\Delta V = 1$ V
$\Delta V \text{ (total)} = \Delta V_{esr} + \Delta V_{cap}$
$\Delta V_{esr} = 0.25 \times 0.1 = 0.025$ V (small drop)
Operating at 4 V, using $\Delta V_{cap} \sim 1$ V Estimated C~1 Farad from I=C*dV/dt (Note that voltage drop due to ESR is small, so even if it doubles the impact is small.)

For another example application, key electrical parameters which may be achieved through the presently disclosed technology includes a Capacitance of 1 F, a Voltage Rating of 4.2 volts, a Temperature Operational Range Rating of −40° to 70° C., and an ESR of 100 mΩ.

The presently disclosed subject matter helps to address a desire for increased power density by, in part, using an organic electrolyte in place of water-based electrolyte, and in part, by using a very thin design (with the ability to stack layers) down to such as 0.5 mm (or less) instead of prior art devices more on the order of about 2 to 3 mm. Such an ultra-thin construction, with the ability to be put into parallel with batteries, can increase battery life (usage life) by 35%.

Another advantage of the presently disclosed subject matter is relatively increased operating temperature range. Preferably, for example, an electrolyte is used having a boiling point over 200° C., such as up to 240° C. A preferred example includes at least some of propylene carbonate (PC). If one practicing the presently disclosed subject matter makes use of thermally stable materials for sealant, then the electrolytes and terminals aren't a limitation in high temperature operational ranges. For example, increased temperature range abilities, to 90° C. at half-rated voltage are possible, and with storage capabilities at 105° C. such that the device still holds shape.

In general, an aspect of the presently disclosed subject matter also contributing to its ability to retain shape while withstanding relatively higher temperatures relates to manufacturing process. Advantageously, water/moisture is kept out of the manufacturing environment to a very high degree. For example, it is known for lithium oxide battery production to try and keep moisture to 0.01 to 0.1%, which relates to 100 to 1000 ppm water. However, in this instance, beneficial shape-resistance to heat is achieved in combination with the other aspects herewith disclosed by limiting moisture environment to only 0.001%, which relates to 10 ppm. At that very low moisture environment level, any enlargement as a response to performance at the limits of intended heat ranges is negligible.

Carbon carbon capacitor (CC Cap) constructions are achieved in part through use of very thin separator layers between the respective layers. As will be understood by those of ordinary skill in the art from the complete disclosure herewith, further embodiments may be formed stacking the thin capacitors to selectively achieve increased capacitance and/or voltage. For example, two devices of 2.1 volts each, placed in series can act as a substitute for a 3.6 v lithium battery. The resulting ultra-thin presently disclosed subject matter provides embodiments so small that it achieves for example the possibility of positioning a battery in an added case for a cell phone, due to the greatly reduced dimensions. In general, the presently disclosed ECDL electrochemical double layer capacitors (ECDL) subject matter can serve as supercaps or ultracaps, to provide energy storage devices useful for a variety of other product arrangements. One further example is for use in or as an uninterrupted power supply (UPS). Of course, various arrangements may result from series and/or parallel connected embodiments, to increase capacitance and/or voltage, as will be understood by those of ordinary skill in the art.

In general, the presently disclosed subject matter relates to an ultra-thin version of an ultra-low ESR supercap, which achieves increased power density in a supercapacitor through use of an ultra-low profile design making use of organic electrolyte materials. The resulting subject matter provides very thin devices, down to less than 0.5 mm thick, compared to typical prior art standards of 2 to 3 mm thick. Also, the new design has greatly increased high temperature performance, along with an increase in battery usage life. The presently disclosed very thin design coupled with the high temperature tolerant materials and presently disclosed manufacturing methodology provides excellent results for very low ESR characteristics. Further, the use of an embodiment specifying a propylene carbonate (PC) electrolyte, and having case dimensions of 50 mm long×40 mm wide×0.5 mm thick can also provide very low ESR characteristics.

Regarding very low ESR characteristics, results on the order of less than 150 milli-ohms are contemplated, even in combination with operation at an elevated temperature, or storage temperature of up to 105° C.

Figure 3A:
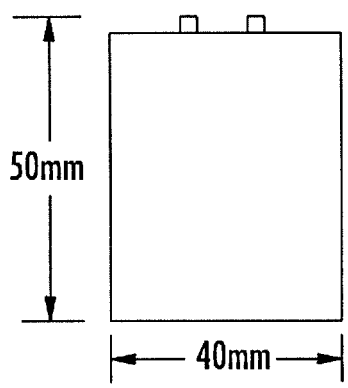
FIGS. 3A and 3B are top and side edge elevational views, respectively, of an exemplary embodiment of an organic electrolyte capacitor device in accordance with presently disclosed subject matter.
Figure 3B:
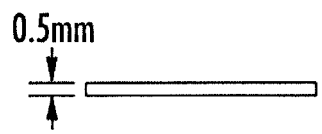
Figure 3C:
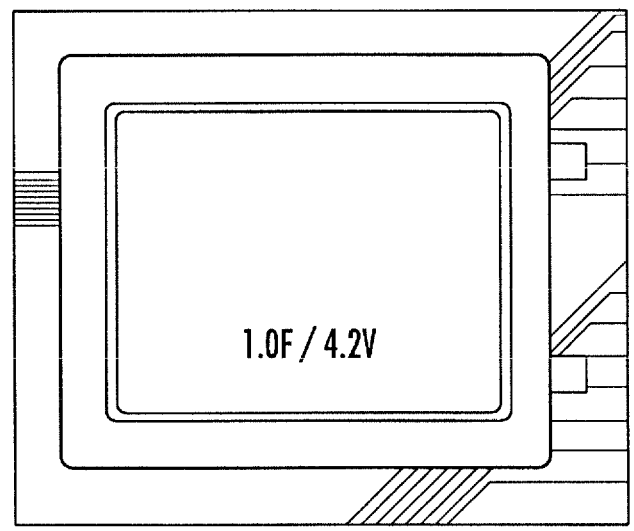
FIGS. 3C and 4C are likenesses, respectively, of exemplary embodiments in accordance with the presently disclosed subject matter of FIGS. 3A/3B and 4A/4B.

FIGS. 3A and 3B are top and side edge elevational views, respectively, of an exemplary embodiment of an organic electrolyte capacitor device in accordance with presently disclosed subject matter, such as shown in greater detail in present FIG. 2. As shown, the exemplary case dimensions of such single cell arrangement are 50 mm long×40 mm wide×0.5 mm thick, and there is a pair of terminals associated with such case. FIG. 3C illustrates a likeness of the exemplary embodiment in accordance with the presently disclosed subject matter of FIGS. 3A and 3B.

Figure 4A:
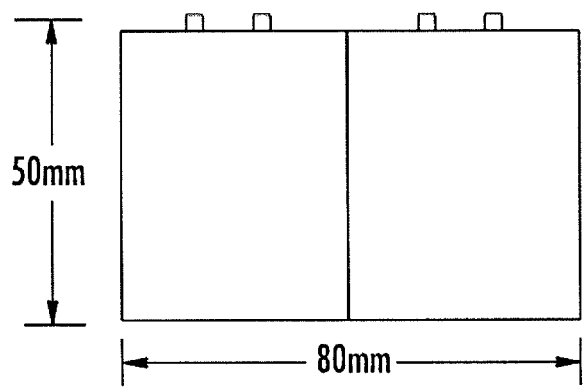
FIGS. 4A and 4B are top and side edge elevational views, respectively, of another exemplary embodiment of an organic electrolyte capacitor device in accordance with presently disclosed subject matter.
Figure 4B:
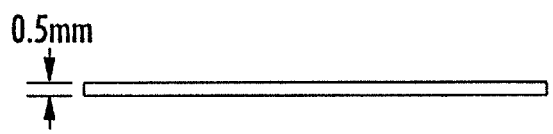
Figure 4C:
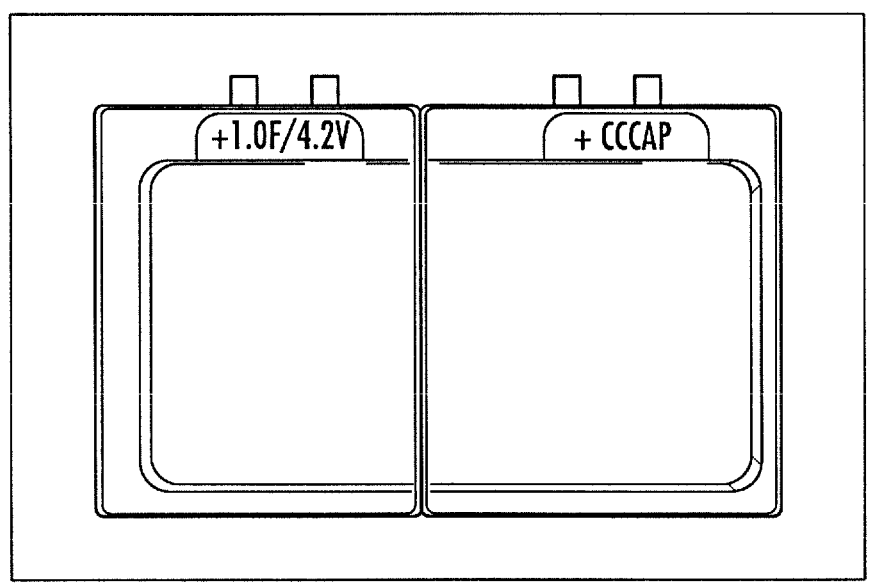

FIGS. 4A and 4B are top and side edge elevational views, respectively, of another exemplary embodiment of an organic electrolyte capacitor device in accordance with presently disclosed subject matter, and illustrating an arranged pair of cells of a construction as shown in greater detail in present FIG. 2. As shown, the exemplary case dimensions of such double (twin) cell arrangement are 50 mm long×80 mm wide×0.5 mm thick, and there are two pairs of terminals associated with such embodiment. FIG. 4C illustrates a likeness of the exemplary embodiment in accordance with the presently disclosed subject matter of FIGS. 4A and 4B.

Figure 5:
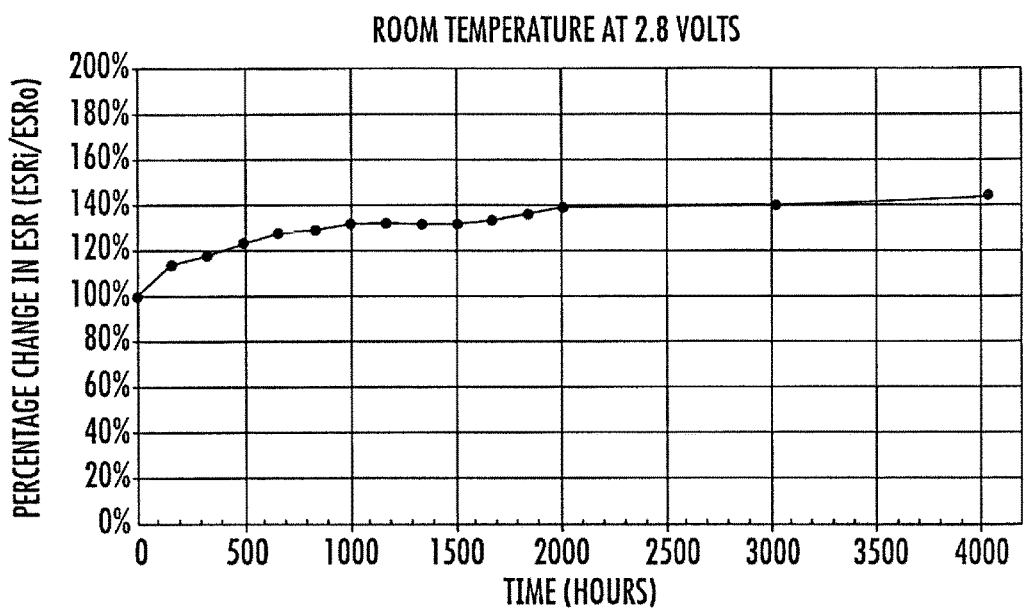
FIG. 5 is a graph of exemplary room temperature load-life (at 2.8 V load) versus percentage change of Equivalent Series Resistance (ESR) for an exemplary embodiment in accordance with the presently disclosed subject matter.
Figure 6:
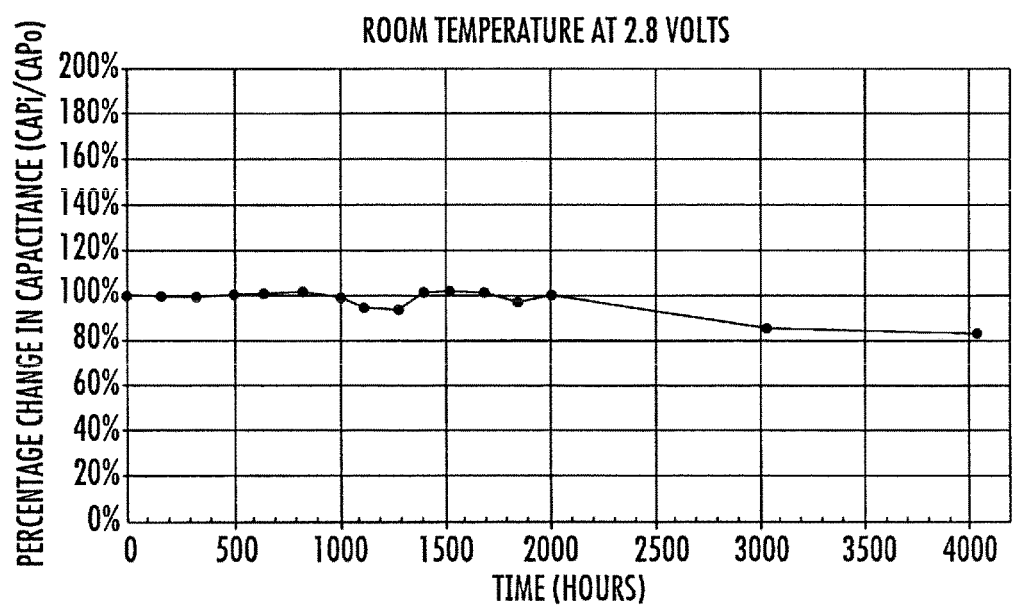
FIG. 6 is a graph of exemplary room temperature load-life (at 2.8 V load) versus percentage change of Capacitance for an exemplary embodiment in accordance with the presently disclosed subject matter.
Figure 7:
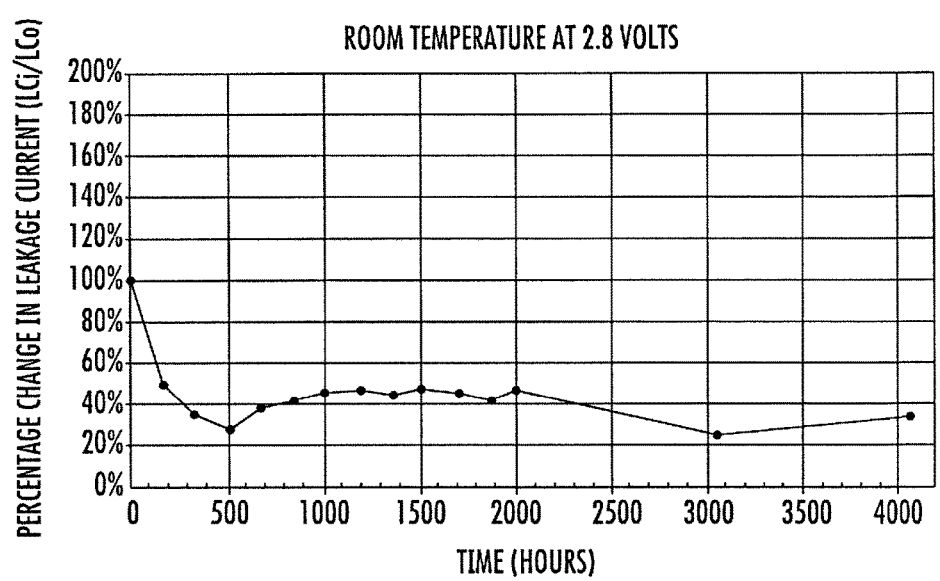
FIG. 7 is a graph of exemplary room temperature load-life (at 2.8 V load) versus percentage change of Leakage Current for an exemplary embodiment in accordance with the presently disclosed subject matter.

FIGS. 5, 6, and 7 are graphs of exemplary room temperature load-life (at 2.8 V load) versus percentage change of Equivalent Series Resistance (ESR), Capacitance, and Leakage Current for an exemplary embodiment in accordance with the presently disclosed subject matter. As shown, the graphs cover time exposure upwards of 4000 hours, to demonstrate reliability test data. The reflected data show good commercial performance in all categories tested. An additional aspect of such reliability testing, as will be understood by those of ordinary skill in the art, is that the testing voltage (2.8 $V_T$) is intentionally much higher than the rated voltage (2.1 $V_R$). Such an approach to testing well demonstrates that the devices being tested are regarded as robust because it is understood by those of ordinary skill in the art that electrochemical devices are in practice typically used at rated voltage or at lower than rated voltage. Thus, testing voltages herein (such as 2.8 $V_T$) are not intended as conveying a higher rated voltage (such as 2.1 $V_R$).

Figure 8:
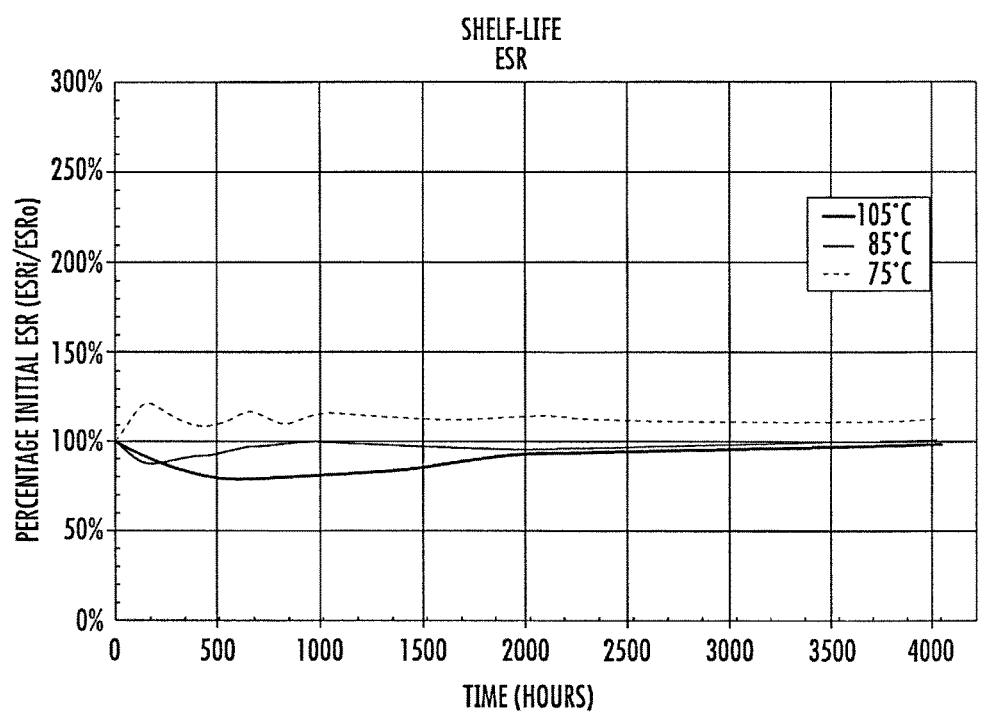
FIG. 8 is a graph of exemplary shelf-life at temperatures of 75° C., 85° C., and 105° C., respectively, versus percentage change in ESR for an exemplary embodiment in accordance with the presently disclosed subject matter.
Figure 9:
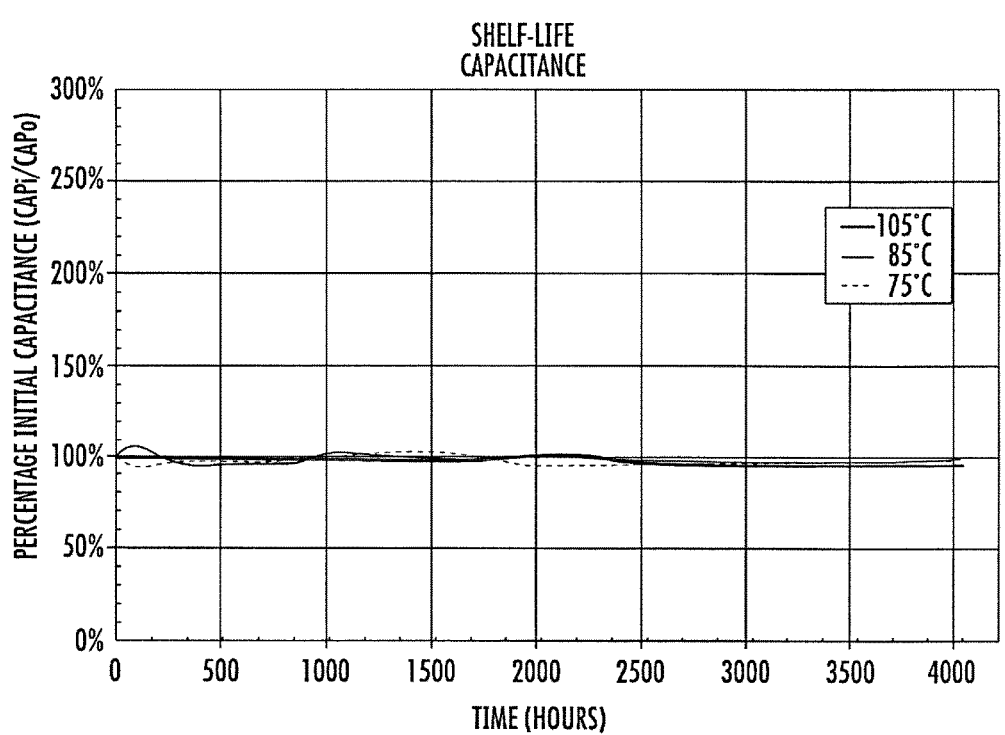
FIG. 9 is a graph of exemplary shelf-life at temperatures of 75° C., 85° C., and 105° C., respectively, versus percentage change in Capacitance for an exemplary embodiment in accordance with the presently disclosed subject matter.

FIG. 8 and graphical illustrate reliability test data (over a 4000 hours axis) for exemplary shelf-life at respective temperatures of 75° C., 85° C., and 105° C., respectively, for an exemplary embodiment in accordance with the presently disclosed subject matter. FIG. 8 data addresses percentage change in ESR while FIG. 9 data addresses percentage change in Capacitance. As shown, the presently disclosed subject matter shows good performance even when operating in extended temperature ranges.

Figure 10:
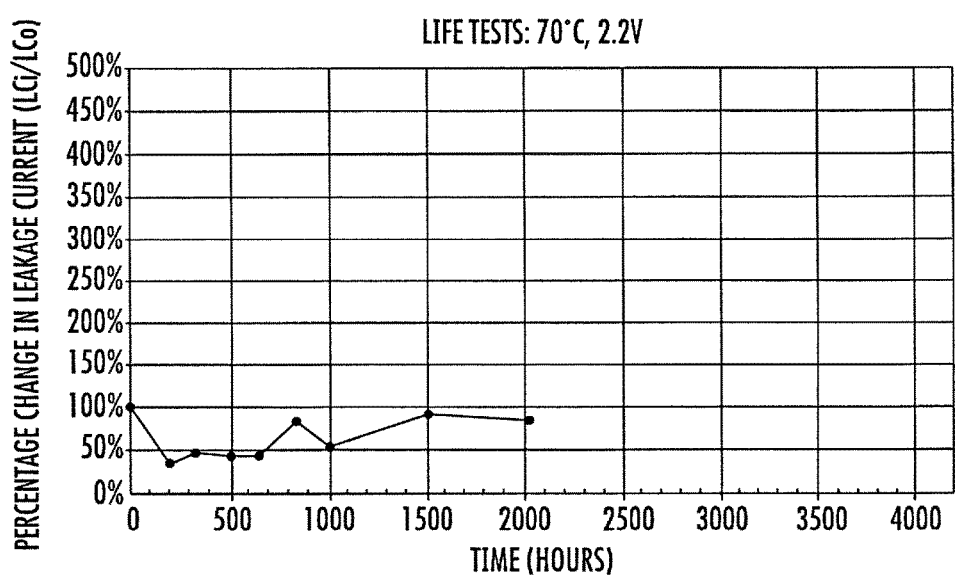
FIG. 10 is a graph of exemplary load-life (at a temperature of 70° C. and 2.2V load) versus percentage change in Leakage Current for an exemplary embodiment in accordance with the presently disclosed subject matter.
Figure 11:
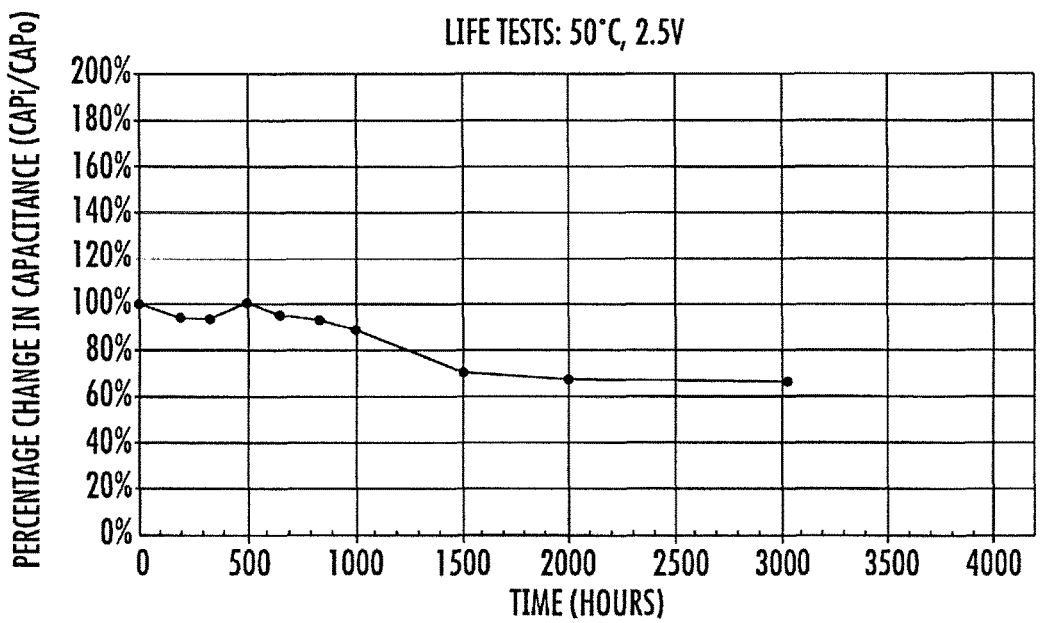
FIG. 11 is a graph of exemplary load-life (at a temperature of 50° C. and 2.5V load) versus percentage change in Capacitance for an exemplary embodiment in accordance with the presently disclosed subject matter.
Figure 12:
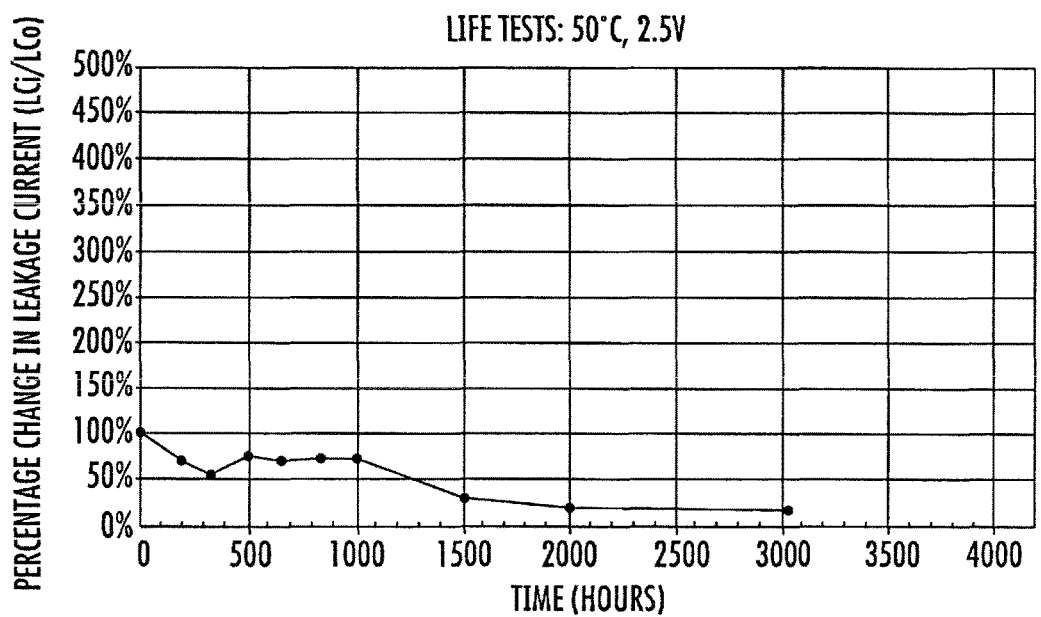
FIG. 12 is a graph of exemplary load-life (at a temperature of 50° C. and 2.5V load) versus percentage change in Leakage Current for an exemplary embodiment in accordance with the presently disclosed subject matter.

FIG. 10 is a graph of exemplary load-life versus percentage change in Leakage Current for an exemplary embodiment in accordance with the presently disclosed subject matter. Measurements again are from a reliability test data perspective, and address operation at a temperature of 70° C. and 2.2V load. FIGS. 11 and 12 are similar graphs but encompass addressing operation at a temperature of 50° C. and 2.5V load. Graphs of FIGS. 11 and 12 also specifically indicate percentage changes in Capacitance and Leakage Current, respectively.

Figure 13:
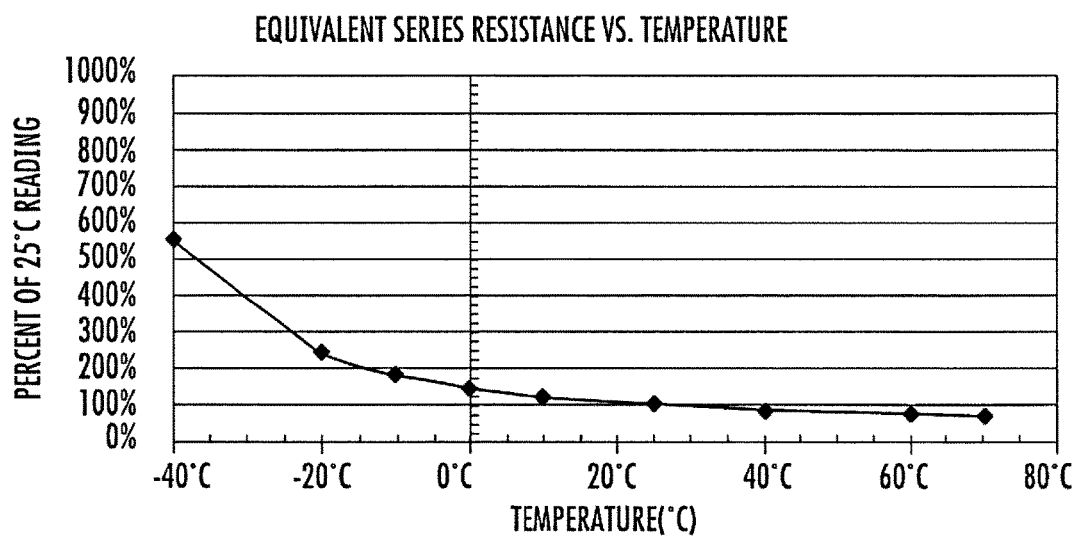
FIG. 13 is a graph of exemplary ESR versus temperature for an exemplary embodiment in accordance with the presently disclosed subject matter.
Figure 14:
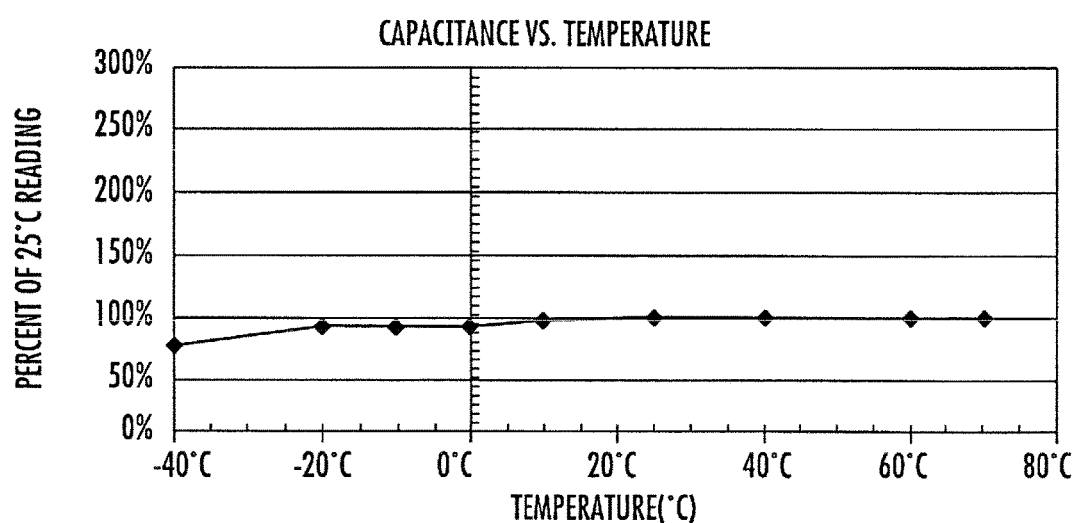
FIG. 14 is a graph of exemplary Capacitance versus temperature for an exemplary embodiment in accordance with the presently disclosed subject matter.
Figure 15:
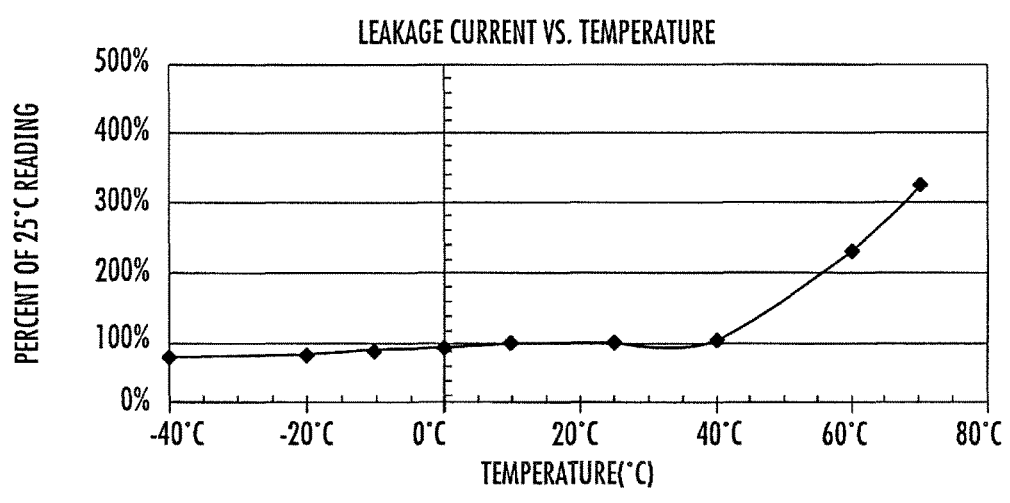
FIG. 15 is a graph of exemplary Leakage Current versus temperature for an exemplary embodiment in accordance with the presently disclosed subject matter.

FIGS. 13, 14, and 15 graphically illustrate various electrical properties versus temperature, for an exemplary embodiment in accordance with the presently disclosed subject matter. FIG. 13 represents graphed percentage changes in ESR, showing that from 0° C. and above, ESR is maintained within about ±50% of the room temperature value, so that a very low ESR is achieved over a wide temperature range, FIG. 14 represents changes in Capacitance and shows only about a ±25% change over a range from −40° C. to 70° C. FIG. 15 also shows stable Leakage Current performance over the indicated temperature range.

FIGS. 16 through 19 graphically illustrate pertinent data relative to voltage cycling testing of an exemplary embodiment in accordance with the presently disclosed subject matter, using a frequency generator and power amplifier testing arrangement. In particular, FIGS. 16 and 17 relate to test usage of an exemplary GSM Waveform, while FIGS. 18 and 19 relate to test usage of an exemplary Triangle Waveform. The indicated sample GSM waveform relates to a 217 Hz GSM Square Wave with a 25% duty cycle, shown over a 1.4V to 2.8V testing range. The indicated sample Triangle waveform reflects a 0.1 Hz Triangle Wave, also over a 1.4V to 2.8V testing range.

Figure 16:
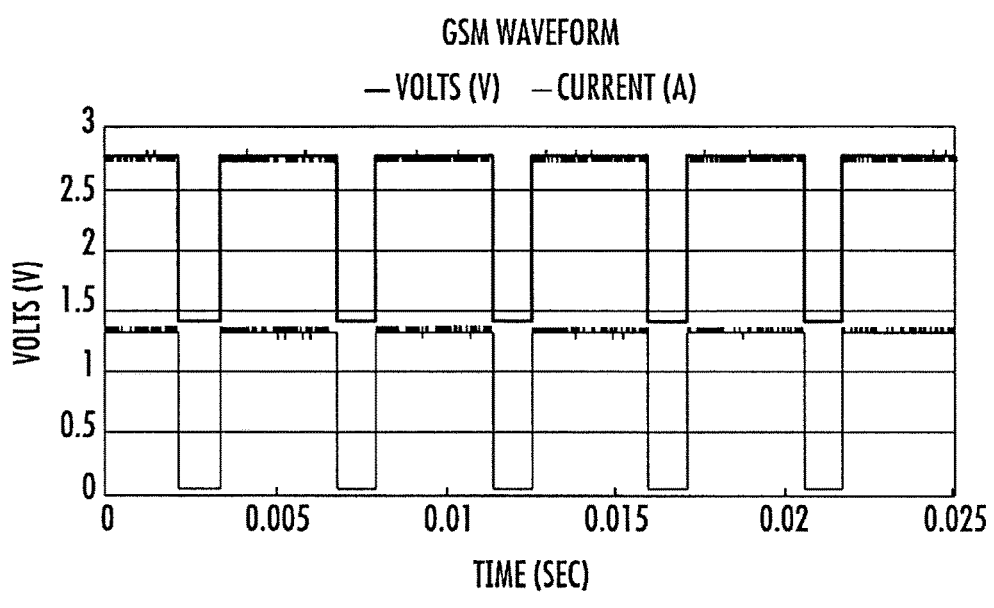
FIG. 16 is a graph of an exemplary GSM Waveform, showing both Voltage and Current versus time, which may be used in a voltage cycling test conducted with an exemplary embodiment in accordance with the presently disclosed subject matter.
Figure 17:
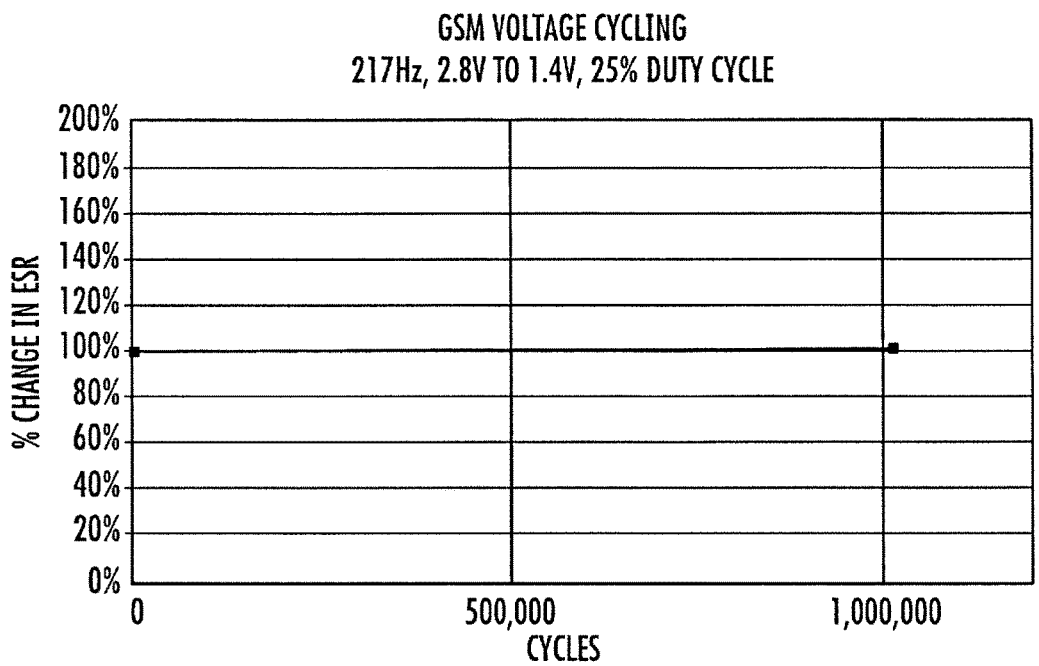
FIG. 17 is a graph of exemplary percentage change in ESR versus number of cycles in GSM Waveform voltage cycling with an exemplary embodiment in accordance with the presently disclosed subject matter.
Figure 18:
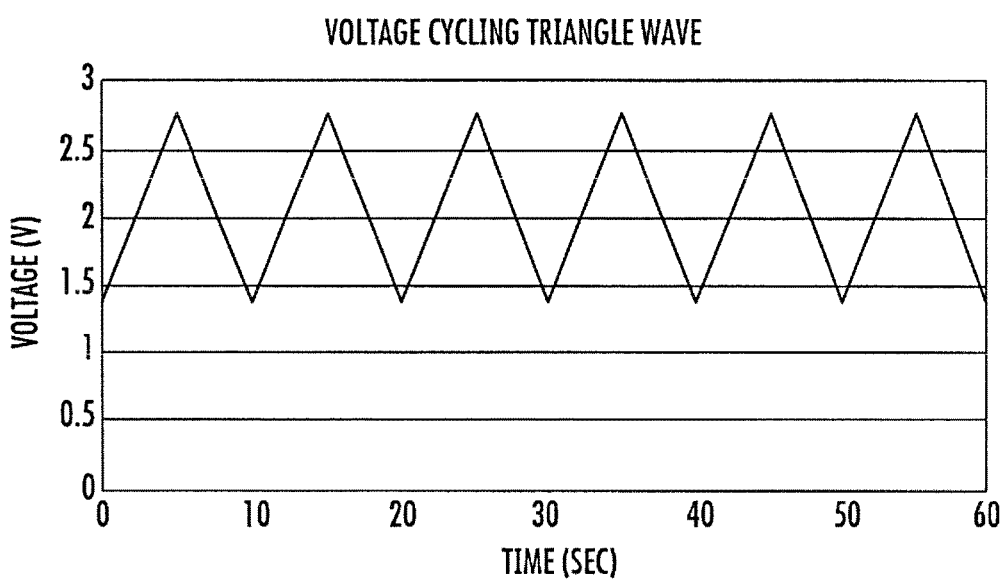
FIG. 18 is a graph of an exemplary Triangle Waveform, showing Voltage versus time, which may be used in a voltage cycling test conducted with an exemplary embodiment in accordance with the presently disclosed subject matter.
Figure 19:
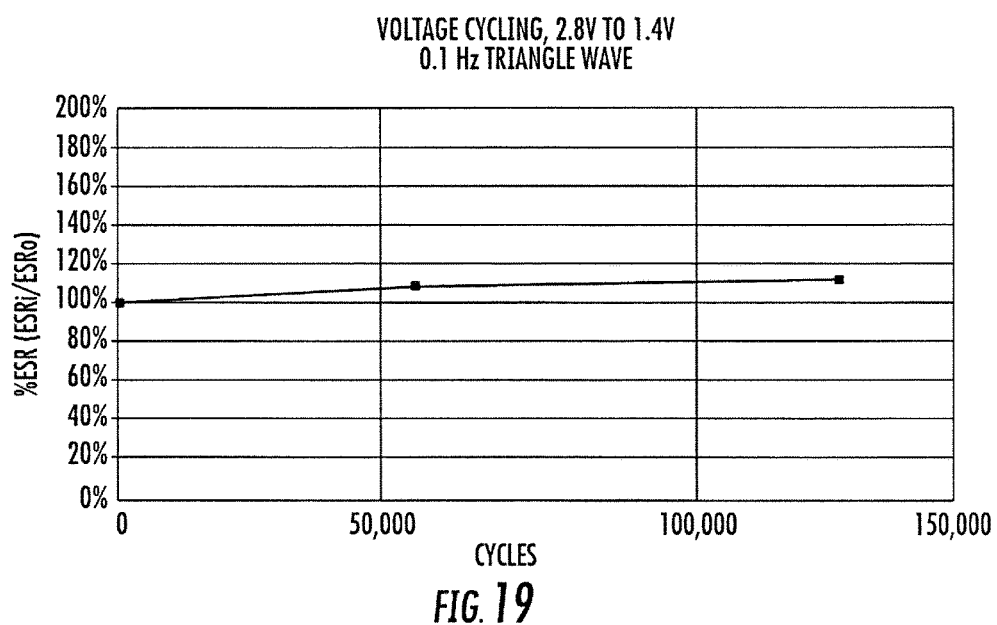
FIG. 19 is a graph of exemplary percentage change in ESR versus number of cycles in Triangle Waveform voltage cycling with an exemplary embodiment in accordance with the presently disclosed subject matter.

More particularly, FIG. 16 shows both Voltage and Current versus time for the exemplary GSM wave, which may be used in a voltage cycling test conducted with an exemplary embodiment in accordance with the presently disclosed subject matter, while FIG. 17 tracks endurance performance as an exemplary percentage change in ESR through one million cycles of such test waveform, FIG. 18 shows Voltage versus time for the exemplary Triangle wave, which may be used in a voltage cycling test conducted with an exemplary embodiment in accordance with the presently disclosed subject matter, while FIG. 19 tracks endurance performance as an exemplary percentage change in ESR through 150,000 cycles of such test waveform. Both FIGS. 17 and 19 reflect only generally negligible changes in ESR performance over such endurance cycle testing.

In sum, an exemplary embodiment of the presently disclosed subject matter may comprise exemplary case dimensions of 50 mm long×40 mm wide×0.5 mm thick, and with a pair of terminals associated with such case (see subject FIGS. 3A and 3B), and use preferably at least some of a propylene carbonate (PC) electrolyte. Such an exemplary embodiment may have a voltage rating ($V_r$) of 2.1 Volts and a capacitance of 2.1 F/cc. It may provide good performance at 90° C. and at 0.5 rated volts operation. At the same time, it can avoid bulging and maintain dimensional stability even at up to 105° C. storage temperature, while also maintaining very low ESR of 150 milli-Ohms and normalized ESR/Cap of about 72 milli-Ohms/cc/F.

Overall, presently disclosed embodiments are capable of showing excellent high power pulse capabilities, together with low leakage currents over capacitance density greater than about 10 F/cc of active electrode volume. Testing data also shows enhanced temperature range performance, including no degradation of half-rated voltages at elevated temperatures and maintained shelf life and relatively higher temperatures (such as 105° C.).

While the presently disclosed subject matter has been described in detail with respect to specific embodiments thereof, it will be appreciated that those skilled in the art, upon attaining an understanding of the foregoing may readily adapt the presently disclosed technology for alterations or additions to, variations of, and/or equivalents to such embodiments. Accordingly, the scope of the present disclosure is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. An ultra-thin electrochemical energy storage device, comprising:
   a pair of respective internal electrodes with electrolyte;
   a separator layer between said respective electrodes;
   a pair of respective current collectors, with one each of said current collectors respectively outside each of said electrodes; and
   a case surrounding said current collectors, and having a respective pair of terminals connected respectively with said current collectors;
   wherein the contents of said case have a thickness down to less than 0.5 millimeters; and
   wherein said device has a resistivity of no more than about 1.5 $\Omega \cdot cm^2$ of electrode area.

2. An ultra-thin electrochemical energy storage device as in claim 1, wherein said case has a moisture content of no more than about 10 ppm.

3. An ultra-thin electrochemical energy storage device as in claim 1, wherein said electrolyte comprises an organic electrolyte.

4. An ultra-thin electrochemical energy storage device as in claim 1, wherein said electrolyte includes at least some of propylene carbonate.

5. An ultra-thin electrochemical energy storage device as in claim 1, wherein:
   said device has a temperature operational range rating of −40° to 70° C.

6. An ultra-thin electrochemical energy storage device as in claim 1, further comprising a plurality of said devices arranged as multiple cells positioned in a plurality of stacks configured in one of series or parallel connections, or combinations thereof.

7. An ultra-thin electrochemical energy storage device as in claim 1, wherein:
   said device includes a plurality of said pair of internal electrodes, separator layer, and said pair of current collectors surrounded by said case; and
   said case has a thickness of from 0.5 millimeters to 5.0 millimeters.

8. An ultra-thin electrochemical energy storage device as in claim 1, wherein:
   said electrolyte comprises an organic electrolyte; and
   said device comprises an electrochemical double layer (ECDL) capacitor having a capacitance density of at least about 10 Farads per cc of active electrode volume.

9. An ultra-thin electrochemical energy storage device as in claim 8, wherein:
   said electrolyte has a boiling point over 200° C.;
   said case further includes thermally stable sealant materials; and
   said capacitor has a temperature operational half-voltage range rating of up to 90° C.

10. An ultra-thin electrochemical energy storage device as in claim 8, wherein:

said organic electrolyte includes at least some of propylene carbonate; and said case has dimensions of about 50 mm long×40 mm wide×0.5 mm thick, and maintains dimensional stability at up to about 105° C. storage temperature, while also maintaining very low ESR of down to about 150 mΩ.

11. An ultra-thin, ultra-low ESR supercapacitor, comprising:

a pair of respective internal electrodes with organic electrolyte;

an ultra-thin separator layer between said respective electrodes;

a pair of respective multi-layer current collectors, with one each of said current collectors respectively outside each of said electrodes; and a case surrounding said current collectors, and having a respective pair of terminals connected respectively with said current collectors;

wherein the contents of said case have a thickness down to less than 0.5 millimeters, and a moisture content of no more than about 10 ppm, and said supercapacitor has a resistivity of no more than about 1.5 Ω·cm$^2$ of electrode area, capacitance density of at least about 10 Farads per cc of active electrode volume, and a temperature operational range rating of −40° to 70° C.

12. A supercapacitor as in claim 11, wherein said supercapacitor comprises a carbon double layer capacitor with a voltage rating of 4.2 volts, and a temperature operational half-voltage range rating of −40° to 90° C.

13. A supercapacitor as in claim 11, wherein said organic electrolyte includes at least some of propylene carbonate.

14. A supercapacitor as in claim 13, wherein said case has dimensions of about 50 mm long×40 mm wide×0.5 mm thick, and maintains dimensional stability at up to about 105° C. storage temperature, while also maintaining very low ESR of down to about 150 mΩ.

15. A supercapacitor as in claim 11, further comprising a plurality of said supercapacitors arranged as multiple cells positioned in a plurality of stacks.

16. A supercapacitor as in claim 15, wherein said stacks of multiple cells are arranged in one of series or parallel connections, or combinations thereof.

17. A supercapacitor as in claim 11, wherein:

said device includes a plurality of said pair of internal electrodes, separator layer, and said pair of current collectors surrounded by said case; and said case has a thickness of from 0.5 millimeters to 5.0 millimeters.

18. A supercapacitor as in claim 11, wherein:

said electrolyte has a boiling point over 200° C.;

said case further includes thermally stable sealant materials; and said supercapacitor has a temperature operational half-voltage range rating of up to 90° C.

19. Methodology for manufacturing an ultra-thin electrochemical energy storage device, comprising:

providing a pair of respective internal electrodes with electrolyte, and with a separator layer between such respective electrodes;

providing a pair of respective current collectors, with one each of such current collectors respectively outside each of such electrodes; and surrounding such current collectors with a case having a respective pair of terminals connected respectively with such current collectors;

wherein the contents of such case have a thickness down to less than 0.5 millimeters; and wherein said device has a resistivity of no more than about 1.5 Ω·cm$^2$ of electrode area.

20. Methodology as in claim 19, wherein said methodology is performed in a controlled environment having a moisture content of no more than about 10 ppm.

21. Methodology as in claim 19, wherein said electrolyte comprises an organic electrolyte.

22. Methodology as in claim 19, wherein said electrolyte includes at least some of propylene carbonate.

23. Methodology as in claim 19, wherein:

said device has a temperature operational range rating of −40° to 70° C.

24. Methodology as in claim 19, further comprising arranging a plurality of said devices as multiple cells positioned in a plurality of stacks configured in one of series or parallel connections, or combinations thereof, for selectively achieving desired capacitance and/or operational voltage levels.

25. Methodology as in claim 19, wherein:

said device includes a plurality of said pair of internal electrodes, separator layer, and said pair of current collectors surrounded by said case; and said case has a thickness of from 0.5 millimeters to 5.0 millimeters.

26. Methodology as in claim 19, wherein:

said electrolyte comprises an organic electrolyte; and said device comprises an electrochemical double layer (ECDL) capacitor having a capacitance density of at least about 10 Farads per cc of active electrode volume.

27. Methodology as in claim 26, wherein:

said electrolyte has a boiling point over 200° C.;

said case further includes thermally stable sealant materials; and said capacitor has a temperature operational half-voltage range rating of up to 90° C.

28. Methodology as in claim 26, wherein:

said organic electrolyte includes at least some of propylene carbonate; and said case has dimensions of about 50 mm long×40 mm wide×0.5 mm thick, and maintains dimensional stability at up to about 105° C. storage temperature, while also maintaining very low ESR of down to about 150 mΩ.

29. Methodology for making an ultra-thin, ultra-low ESR supercapacitor, comprising:

providing a pair of respective internal electrodes with organic electrolyte, and with an ultra-thin separator layer between such respective electrodes;

providing a pair of respective multi-layer current collectors, with one each of such current collectors respectively outside each of such electrodes; and surrounding such current collectors with a case having a respective pair of terminals connected respectively with such current collectors;

wherein the contents of said case have a thickness down to less than 0.5 millimeters, and said methodology is performed in a controlled environment having a moisture content of no more than about 10 ppm, and said supercapacitor has a resistivity of no more than about 1.5 Ω·cm$^2$ of electrode area, capacitance density of at least about 10 Farads per cc of active electrode volume, and a temperature operational range rating of −40° to 70° C.

30. Methodology as in claim 29, wherein said supercapacitor comprises a carbon double layer capacitor with a voltage rating of 4.2 volts, a temperature operational half-voltage range rating of −40° to 90° C.

31. Methodology as in claim 29, wherein said organic electrolyte includes at least some of propylene carbonate.

32. Methodology as in claim 31, wherein said case has dimensions of about 50 mm long×40 mm wide×0.5 mm thick, and maintains dimensional stability at up to about 105° C. storage temperature, while also maintaining very low ESR of down to about 150 mΩ.

33. Methodology as in claim 29, further comprising a plurality of said supercapacitors arranged as multiple cells positioned in a plurality of stacks, for selectively achieving desired capacitance and/or operational voltage levels.

34. Methodology as in claim 33, wherein said stacks of multiple cells are arranged in one of series or parallel connections, or combinations thereof, for achieving hybrid packs of a battery or batteries combined with a capacitor or capacitors in a single integrated product.

35. Methodology as in claim 29, wherein:
said device includes a plurality of said pair of internal electrodes, separator layer, and said pair of current collectors surrounded by said case; and
said case has a thickness of from 0.5 millimeters to 5.0 millimeters.

36. Methodology as in claim 29, wherein:
said electrolyte has a boiling point over 200° C.;
said case further includes thermally stable sealant materials; and
said supercapacitor has a temperature operational half-voltage range rating of up to 90° C.

* * * * *